United States Patent
Copeland

(12) 
(10) Patent No.: US 9,435,471 B1
(45) Date of Patent: Sep. 6, 2016

(54) PIPE JOINT GASKET AND METHOD OF MAKING SAME

(71) Applicant: McWane Global, Birmingham, AL (US)

(72) Inventor: Daniel A. Copeland, Bessemer, AL (US)

(73) Assignee: McWane, Inc., Birmingham, AL (US)

(*) Notice: Subject to any disclaimer, the term of this patent is extended or adjusted under 35 U.S.C. 154(b) by 0 days.

(21) Appl. No.: 13/940,061

(22) Filed: Jul. 11, 2013

(51) Int. Cl.
*F16L 17/06* (2006.01)
*F16L 21/02* (2006.01)

(52) U.S. Cl.
CPC ..................... *F16L 21/02* (2013.01)

(58) Field of Classification Search
CPC ...... F16J 15/061; F16J 15/104; F16J 15/126; F16J 15/062; F16J 15/121; F16J 15/02; F16J 15/0887; F16J 15/027; F16J 15/127; F16J 15/022; F16J 15/025; F16J 15/064; F16J 15/065; F16J 15/067; F16J 15/068; F16J 15/08
USPC ........ 277/314, 608, 616, 627; 285/337, 343, 285/342, 421
See application file for complete search history.

(56) References Cited

U.S. PATENT DOCUMENTS

| | | | | | |
|---|---|---|---|---|---|
| 3,963,298 | A | * | 6/1976 | Seiler | 277/625 |
| 4,229,026 | A | * | 10/1980 | Seiler | 285/105 |
| 5,219,189 | A | * | 6/1993 | Demoisson et al. | 285/105 |
| 5,295,697 | A | * | 3/1994 | Weber et al. | 277/616 |
| 5,464,228 | A | * | 11/1995 | Weber et al. | 277/615 |
| 5,645,285 | A | * | 7/1997 | Percebois et al. | 277/626 |
| 6,688,652 | B2 | * | 2/2004 | Holmes et al. | 285/105 |
| 7,104,573 | B2 | * | 9/2006 | Copeland | 285/337 |
| D556,866 | S | * | 12/2007 | Darce | D23/269 |
| 7,461,868 | B2 | * | 12/2008 | Allen | 285/39 |
| 7,784,798 | B2 | * | 8/2010 | Walworth et al. | 277/615 |
| 7,883,119 | B2 | * | 2/2011 | Percebois et al. | 285/104 |
| 8,490,273 | B1 | * | 7/2013 | Copeland et al. | 29/451 |
| 2004/0155458 | A1 | * | 8/2004 | Holmes et al. | 285/104 |
| 2009/0273184 | A1 | * | 11/2009 | Wright et al. | 285/337 |

* cited by examiner

*Primary Examiner* — Kristina Fulton
*Assistant Examiner* — Eugene G Byrd
(74) *Attorney, Agent, or Firm* — C. Brandon Browning; Maynard, Cooper & Gale, PC

(57) ABSTRACT

A pipe gasket including a compressible body having a heel portion and a sealing portion and a plurality of metal segments at least partially embedded in the compressible body and circumferentially spaced therein. Each of the metal segments includes a compression arm extending within the sealing portion and radially outward and away from the heel portion, a rounded nose portion extending within the heel portion and an acutely pointed tooth extending radially inward from a segment portion located between the compression arm and the nose portion. The compression arm extends radially outward within the gasket from a point located proximal to the tip of the tooth to a point within the sealing portion that is distal to the tip of the tooth. This arrangement provides for leveraging of the radial forces created by the compression of the sealing portion between the spigot end and the bell end to increase the radially inward force applied by the tooth on the spigot end.

24 Claims, 5 Drawing Sheets

PIPE JOINT GASKET AND METHOD OF MAKING SAME

FIELD OF THE INVENTION

The present invention is directed to a pipe joint gasket and more particularly to a pipe joint gasket including an arrangement of metal segments configured for preventing the separation of interconnected, telescoping pipes during fluid pressurization.

BACKGROUND OF THE INVENTION

Pipe joint gaskets including anti-slip segments for preventing the separation of interconnected, telescoping pipes in applications where a fluid such as water for fire mains is held under high pressure are known in the art. Exemplary gaskets are described in U.S. Pat. Nos. 5,295,697 and 5,464,228 in which a rubber gasket, serving as a fluid seal, includes toothed metal segments spaced uniformly around its inner perimeter. The toothed metal segments bite into the outer surface of the spigot of the inserted pipe and prevent withdrawal of the inserted pipe from a bell end of the other pipe. The metal segments pivot about a retainer bead in the bell end of the other pipe to allow the spigot end to be inserted into the bell end of the other pipe while preventing withdrawal of the inserted pipe under high fluid pressure conditions.

A shortcoming of such gaskets is that during fluid pressurization of the interconnected pipes, the segments may fail to sufficiently engage the spigot end thereby allowing the spigot end to slide out of the gasket and bell end when pressurized. Another shortcoming of such pipes is that during insertion of the spigot end into the bell end, the segments may engage the spigot end to such a degree that the gasket is pushed out of the gasket retaining groove of the bell end and thus out of position. When this occurs the gasket may fail to form a seal between the interconnected pipe. Also, when the gasket is positioned improperly between the interconnected pipes the tolerances required to form a seal increase greatly thus, for example, requiring better alignment of the pipes.

SUMMARY OF THE INVENTION

The present invention is directed to a gasket for preventing the separation and fracturing of telescoped pipes during fluid pressurization of the pipes. According to one aspect of the invention there is provided a pipe gasket including a compressible body having a heel portion and a sealing portion and a plurality of metal segments at least partially embedded in the compressible body and circumferentially spaced therein. Each of the metal segments includes a compression arm extending within the sealing portion and radially outward and away from the heel portion, a rounded nose portion extending within the heel portion, and a single, acutely pointed tooth extending radially inward from a segment portion located between the compression arm and the nose portion. The nose portion and the compression arm are arranged to form an angle along an outer radial surface of the metal segment of about 130° to about 180°, preferably 140° to about 170° and more preferably 150° to about 165°.

The metal segments are configured to ensure that a pipe joint composed of the gasket of the present invention, a spigot end of a first pipe and a bell end of a second pipe remains intact upon initial pressurization of the pipe joint. This is accomplished by promoting the effective engagement of the single, acutely pointed tooth of each segment with the spigot end upon initial pressurization of the joint. To promote engagement of a segment tooth with the spigot end, the compression arm in each segment is extended radially outward within the gasket from a point located proximal to the tip of the tooth to a point within the sealing portion that is distal to the tip of the tooth. This arrangement provides for leveraging of the radial forces created by the compression of the sealing portion between the spigot end and the bell end to increase the radially inward force applied by the tooth on the spigot end. This way, upon initial pressurization of the pipe joint, the likelihood that the teeth will engage the spigot end is improved.

DETAILED DESCRIPTION OF PRESENTLY PREFERRED EMBODIMENTS

Figure 3:
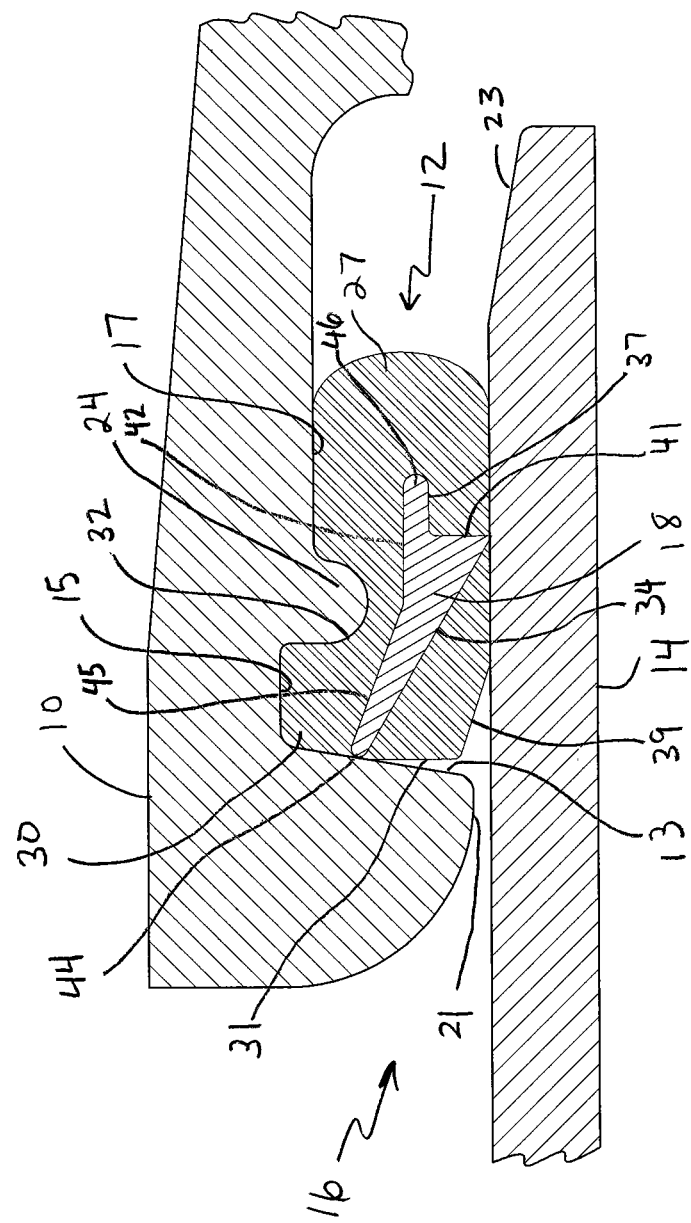
FIG. 3 is a fragmented cross-sectional view of the bell end, the gasket and the spigot end of FIG. 2 illustrating the spigot end fully inserted to the pipe belle.
Figure 4:
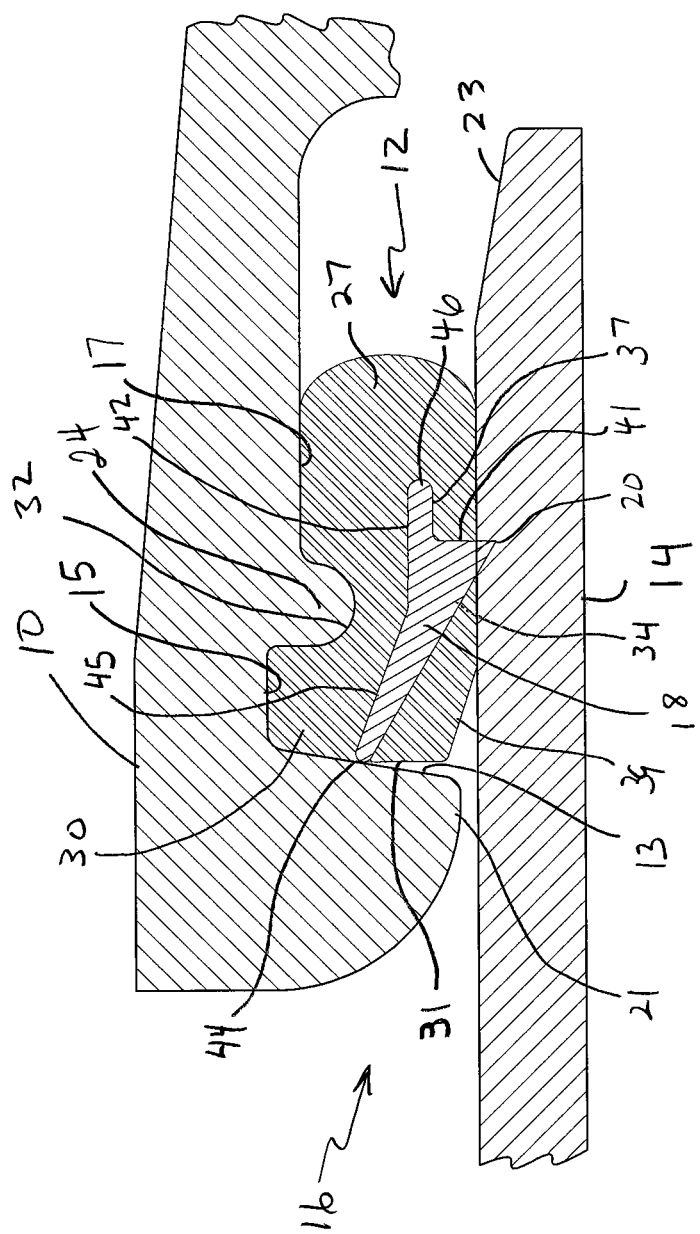
FIG. 4 is a fragmented cross-sectional view of the bell end, the gasket and the spigot end of FIG. 3 illustrating the arrangement of the gasket following pressurization of the interconnected pipes.
Figure 5:
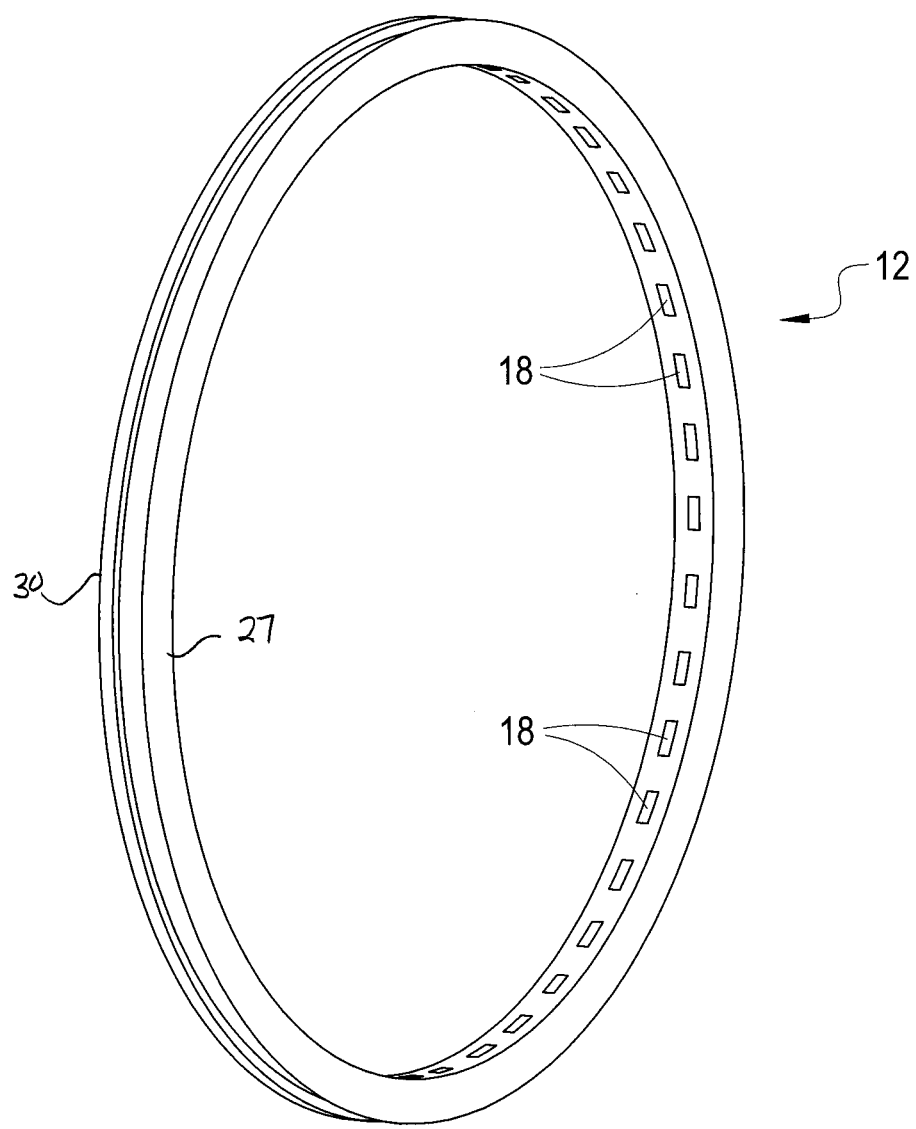
FIG. 5 is a top view of a gasket of the present invention showing the placement of metal segments around its periphery.

FIGS. 1 through 4 depict a fragmented cross-sectional view of a bell end 10 of a first pipe, a spigot end 14 of a second pipe entering the pipe bell and the operation of a gasket 12 spaced between the bell end and the spigot end upon entry of the spigot end there through and the fluid pressurization a pipe joint 16 created between bell end 10 and spigot end 14. In particular, these figures illustrate the arrangement and operation of metal segments 18 in gasket 12 relative to bell end 10 and spigot end 14 during the formation and fluid pressurizing of joint 16. FIG. 5 is provided to show the circumferential arrangement and spacing of metal segments 18 throughout gasket 12.

Figure 1:
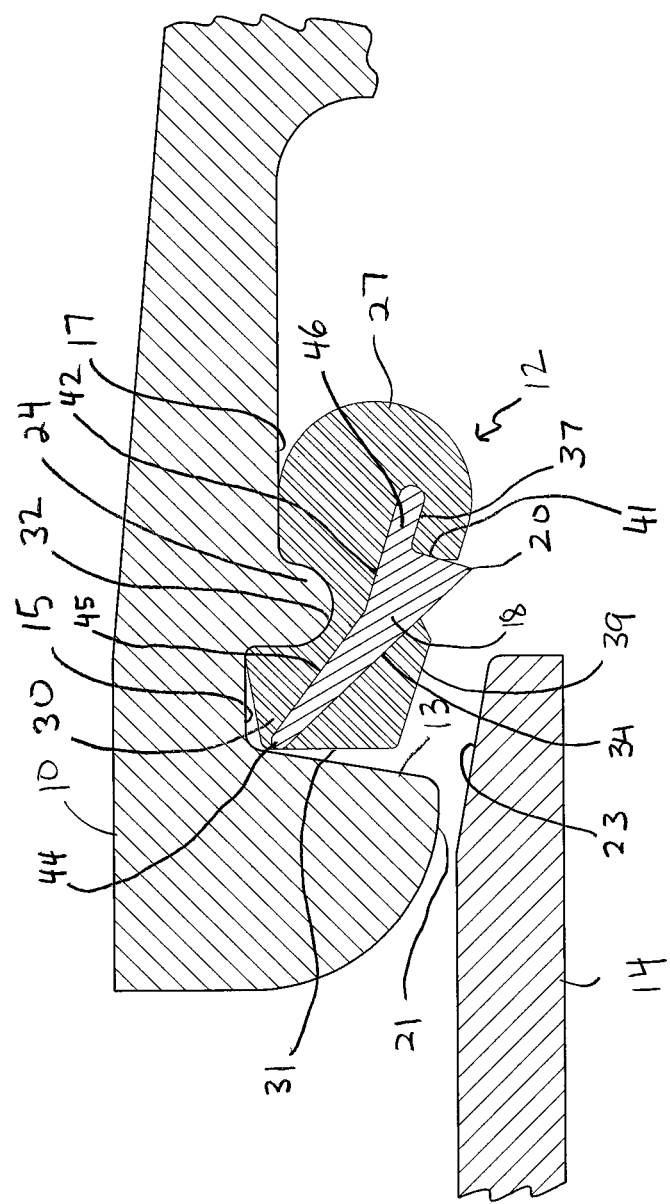
FIG. 1 is a fragmented cross-sectional view of a bell end of one pipe containing a gasket in accordance with a preferred embodiment of the present invention and a spigot end of another pipe entering the pipe bell.

Generally, gasket 12 is arranged for inhibiting leakage about joint 16 between the inside walls of bell end 10 and the outside wall of spigot end 14. More particularly, as illustrated in FIGS. 1 and 4, the inner surface of bell end 10 includes a retainer groove bounded by a radially extending front wall 13 and an axially extending retainer wall 15, and an axially extending sealing wall 17. Extending radially inward from retainer wall 15 between front wall 13 and sealing wall 17 is a retainer shoulder 24. Retainer shoulder 24 may be arranged as a bead, as illustrated in the figures, or as a corner or edge as depicted in U.S. Pat. No. 6,688,652. Gasket 12 is positioned within the retainer groove with an outer face thereof being arranged adjacent to axially extending retainer wall 15, a heel portion 30 arranged between front wall 13 and retainer shoulder 24, and a sealing bulb portion 27 arranged against sealing wall 17. The outer face of gasket 12 includes an annular groove 32 formed between heel portion 30 and sealing portion 27 which partially encircles retainer shoulder 24.

Inserted into gasket 12 are a plurality of metal segments 18. As depicted in FIG. 5, segments 18 are spaced apart equally in a circumferential direction around the periphery of gasket 12. Metal segments 18 are firmly vulcanized into radial grooves found within heel portion 30 in gasket 12. The number of metal segments 18 inserted into gasket 12 varies depending upon the anticipated fluid pressure at joint 16 and the size of the pipes involved.

Metal segments 18 are configured for increasing the inward radial load asserted by metal segments 18 against spigot end 14 prior to and upon initial pressurization of joint 16 for effectively engaging the segments with the spigot, decreasing the spigot end insertion forced required to seat the spigot end within bell end 10 and gasket 12 and decreasing the radial load exerted between the joined pipes upon pressurization thereof. To that end, each metal segment 18 includes a substantially flat, inner surface 34 and an outer surface. Inner surface 34 extends radially outward from and through an inner axial face 39 of heel portion 30 from a distal end thereof axially towards a front face 31 of heel portion 30 where it terminates in a proximal end. The distal end of inner surface 34 terminates to define, in part, a single, acutely pointed tooth 20 extending radially inward. The proximal end of inner surface 34 terminates to define, in part, a rounded or blunt nose 44.

The outer surface of segment 18 is composed of a two substantially flat sections including a back section 42, which extends radially outward into sealing bulb portion 27 and away from heel portion 30, and a front section 45, which extends radially outward into heel portion 30 and away from sealing bulb portion 27 to thereby taper toward the proximal end of inner surface 34 to form nose 44. In certain instances, it is possible that back section 42 extends within sealing portion 27 and axially to inner axial face 39 of heel portion 30. Back section 42 is supported by a compression arm 46 that extends into sealing bulb portion 27. Compression arm 46 is defined by back section 42 of outer surface 36 and a radial inward surface 37. Radial inward surface and back section 42 terminate in a rounded tip that located with a central portion of sealing bulb portion 27. Extending radially inward from a proximal end of surface 37 at an angle of about 90° is wall 41 which intersects inner surface 34 to define tooth 20. Front section 45 and back section 42 of outer surface 36 form an angle A of about 130° to about 180°, preferably 140° to about 170° and more preferably 150° to about 165°.

Figure 2:
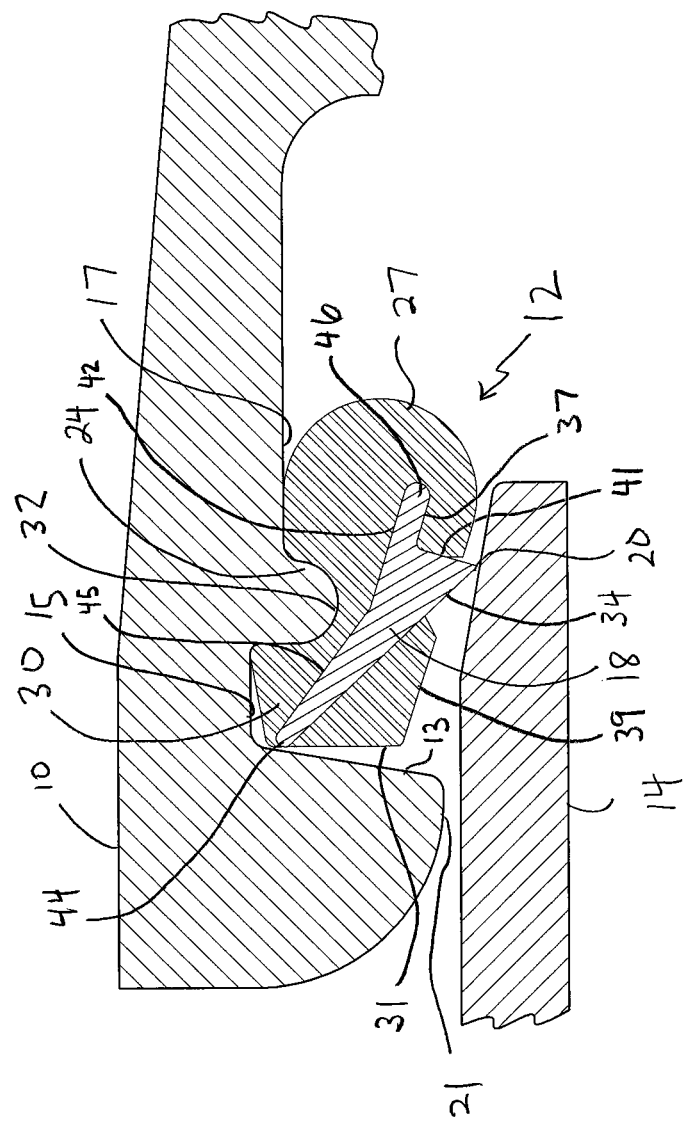
FIG. 2 is a fragmented cross-sectional view of the bell end, the gasket and the spigot end of FIG. 1 illustrating insertion of the spigot through the gasket.

Referring to FIGS. 1 and 2, as joint 16 is assembled, a throat 21 of bell end 10 guides spigot end 14 until a beveled end 23 of spigot end 14 contacts tooth 20. As illustrated in FIGS. 3 and 4, as spigot end 14 continues to slide through gasket 12, retainer shoulder 24 engages with annular groove 32 of gasket 12 thereby preventing the gasket from dislodging from retainer groove 11. The wedging action between beveled end 23 and the conical inner axial face 39 compresses sealing bulb portion 27 between spigot end 14 and sealing wall 17 thereby creating a seal between the interconnected pipes and pressing tooth 20 into spigot end 14.

Contrary to prior art gaskets that include embedded metal locking segments, the compression of sealing bulb portion 27 of the present invention occurs with essentially no rotation of metal segment 18 around retainer shoulder 24. Instead, the interaction of beveled end 23 and with tooth 20 displaces segment 18 substantially radially outwardly rather than rotationally around a bead or shoulder toward a distal end of the pipe bell. This is accomplished since segment 18 is spaced apart from annular groove 32 and retainer shoulder 24 which allows segment 18 to float radially inwardly of bell end 10 without directly or substantially interacting with shoulder 24. Thus, when spigot end 14 is inserted into bell end 10 and presses against tooth 20, segment tends to displace or translate radially outward rather than rotate around shoulder 24. This causes heal portion 30 to be compressed, upon insertion of spigot end 14 into gasket 12, together with sealing bulb portion 27. It also decreases the amount of pressure required to insert the spigot end 14 into the bell end 10 since no radial load path is created through segment 18 and between the pipes.

Referring to FIG. 3, when spigot end 14 is fully inserted through gasket 12 and into bell end 10, with beveled end 23 inserted fully passed sealing bulb portion 27, tooth 20 of segment 18 is in contact with spigot end 14. With sealing bulb portion 27 compressed and applying pressure to back section 42 of the outer surface of the segment, tooth 20 is caused to effectively engage spigot end 14. This accomplished by the arrangement of tooth 20 relative to compression arm 46. The arrangement allows for a leveraging of the pressure asserted by the compression of sealing bulb 27 against compression arm 46 at tooth 20. In particular, compression arm 46 and tooth 20 function as a lever with compression arm acting as a beam and tooth 20 as a fulcrum where the proximal end of the beam is at least partially restrained. In such an arrangement, the leverage force directed against the beam is transferred to the fulcrum such that the force is amplified at the fulcrum.

Referring to FIG. 4, upon pressurization of joint 16, tooth 20 further engages with spigot end 14 by friction or by penetrating into spigot end 14 a short distance. This occurs as the axial load created by the tendency of the pipes to want to separate when under hydrostatic pressure is transmitted radially and axially through and between arm 46 and tooth 20 to front wall 13 of the retainer grove and spigot end 14 thereby resisting pipe separation. As the pressure within joint 16 is increased to normal operating pressures, tooth 20 is caused to penetrate, or penetrate farther, into spigot end 14. Additionally, nose 44, if it has not already, comes to bear directly against front wall 13 of retainer groove 11 thereby arresting axial movement of segment 18 and locking gasket 12 in place within the retainer groove between bell end 10 and spigot end 14.

As will be apparent to one skilled in the art, various modifications can be made within the scope of the aforesaid description. Such modifications being within the ability of one skilled in the art form a part of the present invention and are embraced by the claims below.

It is claimed:

1. A pipe gasket comprising,
   a compressible body including a heel portion, a sealing portion and an annular groove, and
   a plurality of metal segments at least partially embedded in the compressible body and circumferentially spaced therein,
   wherein at least one metal segment of the plurality of metal segments includes a nose, an inner surface, a compression arm extending distally within a sealing portion of the compressible body and a distal-most tooth extending radially inward, the compression arm terminating in a distal tip that is located radially outward and distally to the distal-most tooth, and
   wherein the at least one metal segment is spaced apart from the annular groove and the inner surface forms a portion of the nose and a portion of the distal-most tooth.

2. The gasket according to claim 1 wherein the nose extends portion extending within the heel portion of the compressible body.

3. The gasket according to claim 2 wherein the nose portion and the compression arm intersect to form an angle along an outer surface of the at least one metal segment.

4. The gasket according to claim 3 wherein the angle is between about 130° and about 180°.

5. The gasket according to claim 1 wherein the compression arm extends radially outward and away from the heel portion of the compressible body.

6. The gasket according to claim 5 wherein the at least one metal segment includes a nose portion having an inner surface that extends radially outward and away from the sealing portion of the compressible body and towards a front wall of the heel portion.

7. The gasket according to claim 1 wherein the distal-most tooth is formed by a wall extending radially inward from a base of the compression arm.

8. The gasket according to claim 7 wherein the distal-most tooth is formed by an intersection of the wall and the inner surface of the at least one metal segment, the inner surface extending radially outward toward the heel portion of the compressible body.

9. The gasket according to claim 8 wherein the inner surface is substantially flat.

10. The gasket according to claim 8 wherein the inner surface intersects an outer surface of the at least one metal segment to form the nose portion extending within the heel portion.

11. The gasket according to claim 10 wherein the outer surface intersects the compression arm to form an obtuse angle.

12. A pipe gasket comprising,
a compressible body including a heel portion located proximally, a sealing portion located distally, an annular groove and a plurality of rigid locking segments at least partially embedded in the compressible body,
wherein at least one rigid locking segment of the plurality of rigid locking segments is spaced apart from the annular groove and includes an inner toothed surface from which a distal-most tooth extends radially inward from a segment base portion, a nose extending within the heel portion of the compressible body and a compression arm extending within the sealing portion from the segment base portion and away from the heel portion, the compression arm terminating in a distal tip located radially outward and distally to the entirety of the inner toothed surface and the inner toothed surface forming a portion of the nose and a portion of the distal-most tooth.

13. The gasket according to claim 12 further comprising a wall extending radially inward from the compression arm and terminating at the distal-most tooth.

14. The gasket according to claim 13 wherein the wall and the compression arm define an angle ranging between about 80° and about 100°.

15. The gasket according to claim 12 wherein the nose extends radially outward from the segment base portion.

16. The gasket according to claim 15 wherein the nose is formed by a first intersection of a first wall and a second wall, the first wall forming a second intersection with a third wall extending radially inward from the compression arm, the second intersection defining the distal-most tooth, wherein the first wall includes the inner toothed surface.

17. The gasket according to claim 16 wherein the second wall forms a third intersection with a fourth wall, the fourth forming a radial outward side of the compression arm.

18. The gasket according to claim 17 wherein the fourth wall forms an intersection with a fifth wall that forms a radial inward side of the compression arm, the fifth wall intersecting the third wall.

19. The pipe joint according to claim 12 wherein no portion of the at least one rigid locking segment extends directly between a front face of the heel portion and the annular groove.

20. A pipe gasket comprising,
a heel portion,
a sealing portion,
a retaining groove portion located between the heel portion and the sealing portion, and
a metal segment embedded in the heel portion, the retaining groove portion and the sealing portion, the metal segment being spaced apart from the retaining groove portion and including an inner surface, a nose, a distal-most tooth and a compression arm extending within the sealing portion and away from the heel portion, the compression arm terminating in a distal tip that forms a distal most portion of the metal segment,
wherein the distal tip does not form any portion of a radially inward extending tooth and the inner surface forms a portion of the nose and a portion of the distal-most tooth.

21. The gasket according to claim 20 wherein the nose extends away from the sealing portion and within the heel portion.

22. The gasket according to claim 20 wherein the distal-most tooth extends extending radially inward.

23. The gasket according to claim 20 wherein the metal segment includes a radial outward surface that defines in part the nose and the compression arm, the radial outward surface forming an angle between the nose portion and the compression arm of about 150° to about 170°.

24. The gasket according to claim 21 wherein no portion of the nose extends directly between a front face of the heel portion and an outer face of the retaining groove portion.

* * * * *